US012766499B2

(12) United States Patent
Valdez

(10) Patent No.: US 12,766,499 B2
(45) **Date of Patent: *Oct. 20, 2026**

(54) SYSTEMS AND METHODS FOR SEGREGATING INTO DUAL WASTE STREAMS OXIDIZABLE CATALYST MATERIAL FROM INERT SUPPORT MEDIA

(71) Applicant: The Maitland Company, LLC, Sumter, SC (US)

(72) Inventor: Carlos Valdez, San Antonio, TX (US)

(73) Assignee: The Maitland Company, LLC, Sumter, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/038,926

(22) Filed: Jan. 28, 2025

(65) Prior Publication Data

US 2025/0269365 A1 Aug. 28, 2025

Related U.S. Application Data

(63) Continuation of application No. 18/191,775, filed on Mar. 28, 2023, now Pat. No. 12,214,342, which is a continuation of application No. 17/012,457, filed on Sep. 4, 2020, now abandoned.

(51) Int. Cl.

| | |
|---|---|
| ***B01J 38/72*** | (2006.01) |
| ***B01J 38/04*** | (2006.01) |
| ***B07B 1/34*** | (2006.01) |
| ***B07B 4/02*** | (2006.01) |
| ***B09B 3/40*** | (2022.01) |

(52) U.S. Cl.
CPC ............... *B01J 38/72* (2013.01); *B01J 38/04* (2013.01); *B07B 1/34* (2013.01); *B07B 4/02* (2013.01); *B09B 3/40* (2022.01); *B07B 2201/04* (2013.01)

(58) Field of Classification Search
CPC ............ B01J 38/72; B01J 38/04; B07B 1/34; B07B 4/02; B07B 2201/04; B07B 1/005; B07B 1/28; B07B 1/46; B09B 3/40; B09B 3/80; C22B 7/005; C22B 7/009
See application file for complete search history.

(56) References Cited

U.S. PATENT DOCUMENTS 11,111,743 B2 * 9/2021 Ross ..................... B01D 33/80

* cited by examiner

*Primary Examiner* — Jacob S. Scott
*Assistant Examiner* — Miraj T. Patel
(74) *Attorney, Agent, or Firm* — HOGAN LOVELLS CADWALADER US LLP

(57) ABSTRACT

A method for disposing of a mixture of oxidizable catalyst material and inert support media. The method comprises introducing inert gas into an enclosure. The enclosure contains a plurality of stacked screens, the stacked screens have openings that decrease in size from a top of the stack to a bottom of the stack. The method also comprises introducing the mixture to an uppermost one of the plurality of stacked screens; moving the plurality of stacked screens to cause the oxidizable catalyst material to separate from and migrate to a location beneath the inert support media; conveying the separated inert support media to a location outside the enclosure for disposal as non-hazardous waste; and conveying the separated oxidizable catalyst material to a location outside the enclosure for at least one of reclamation, or thermal destruction.

20 Claims, 7 Drawing Sheets

SYSTEMS AND METHODS FOR SEGREGATING INTO DUAL WASTE STREAMS OXIDIZABLE CATALYST MATERIAL FROM INERT SUPPORT MEDIA

CROSS-REFERENCE TO RELATED APPLICATIONS

This application is a continuation of U.S. patent application Ser. No. 18/191,775, filed Mar. 28, 2023, which is continuation of and claims the benefit of U.S. patent application Ser. No. 17/012,457 filed Sep. 4, 2020, abandoned; both of which are incorporated in their entirety herein for all purposes.

TECHNOLOGICAL FIELD

The present disclosure generally relates to the field of petroleum refinement, and particularly relates to systems and methods for separating refinery byproducts into hazardous and non-hazardous components.

BACKGROUND

The petrochemical refinement industry is constantly searching for ways to improve upon refinery efficiency and cost savings. One avenue for achieving these goals takes place at the front end of the refinement process through refinery material selection. Generally, a combination of catalysts, inert support balls, and grading material (also referred to as topping or trap material) are selected. These materials are loaded into one or more refinery unit vessels in accordance with a loading plan which specifies the quantity and distribution of the materials in the vessels. The particular type of catalyst chosen depends on the desired product (e.g. diesel, jet fuel, or kerosene) and catalyst performance (dictated by expected catalyst lifetime, raw material, desired finish product specifications, and other variables affecting the rate at which the catalyst is consumed). Topping is selected based on the desired application (e.g., hydrotreating, hydrogenation, hydrydrocracking, lube oils, or wax), and inert support balls are generally made of alumina, ceramic or silica.

In use, the inert support balls are loaded into the bottom of the vessel followed by a layer of catalyst (catalyst bed). Layers of inert support balls and catalyst may be deposited in an alternating fashion until, for example, 1-10 layers of catalyst may be deposited with intervening layers of inert support balls. The inert support balls help to evenly distribute raw petrochemical material and synthesized refined product across the catalyst bed. Finally, grading material may be loaded on top of the layers to "trap" or remove impurities such as vanadium, nickel, or arsenic from the raw material. This grading material may be comprised of a single material or various materials, each configured to trap/remove a particular impurity. The catalyst converts the raw material into the refined product. This reaction ultimately causes catalyst activity and pressure within the refinery unit to decrease.

In order to efficiently process additional raw materials, the mixture of catalyst, inert support balls and grading are changed out once the unit pressure and/or catalyst activity fall below a predetermined threshold. During this process, inert gas (often nitrogen) is forced into one or more vessels of the refinery unit to purge any remaining raw material and liquid product. This purge leaves only the catalyst, topping and inert support (collectively known as industrial waste) behind. The day on which this change occurs is commonly known in industry as the "oil out" date and may be predicted using unit performance indicators and raw material specifications. Data relating to a previous oil out date may also be used to predict the next oil out date. A target oil out date is set well in advance (often 18-24 months) to account for replacement catalyst manufacture time. The vessel is allowed to cool down (e.g. to 300° F.) and the remaining catalyst, topping and inert support balls are extracted. Refineries generally replace all of the catalyst within a unit at the same time to take advantage of the "unit down time" and cut costs.

Generally, extraction involves a "gravity dump," during which the catalyst, topping and inert support are permitted to fall through a valve in the bottom of the vessel. The material feeds into a pipe, which leads to flow bins or the desired packaging for holding and transporting the material. The rate at which the material enters the flow bins is generally regulated manually by a valve. Since each flow bin only holds about 1-2.5 tons, this process is repeated (5-500 times depending on the size of the vessel) until the vessel is empty. A vacuum may be used as an alternative to the gravity dump, in which case, material is vacuumed through the top of the vessel and into the flow bins or other packaging of choice.

Once the materials are extracted, the vessels are refilled, and the flow bins (or packaging of choice) are directed to a holding area, where they await inventory, sampling, and profile generation for the destination process facility. The Environmental Protection Agency categorizes spent catalyst and topping as "hazardous waste" (e.g. K171 or K172); therefore, certain disposal guidelines must be followed. Three disposal methods: are common in industry. One such method involves reclamation. During reclamation, the waste is "roasted" to render the hazardous materials inert, then processed using leaching or pyro-metallurgical techniques to extract metals, e.g., vanadium pentoxide, nickel, and molybdenum from the materials. Another method of disposal involves "regeneration." During regeneration, the waste is carefully roasted so that a percentage of the spent catalyst may be re-introduced into the refining process. Yet another method of disposal sends roasted waste to landfill. More recently, refineries have the option to send their waste materials to cement kilns for alumina and energy reclamation. Since kilns process liquids more easily than solids, the catalyst may be transformed into a slurry to facilitate processing. These catalyst particles fall out of the slurry suspension, clogging pipes and disrupting the overall process.

Although inert support is generally classified as non-hazardous (in some instances classified as hazardous) and account for up to 25% of refinery waste, many refineries incur the same cost/pound for processing, packaging, and transporting non-hazardous waste as they do for hazardous waste. This is because refineries do not separate the materials into hazardous and non-hazardous components prior to disposal. This unnecessary expense is often compounded by the cost of international shipping. Available options for separating the materials are insufficient as they still require the refinery to continue to ship waste offsite resulting in additional cost.

The systems and methods described herein address at least some of the drawbacks of traditional industrial waste disposal by simplifying and mobilizing the industrial waste segregation process. Such systems and methods may allow refineries to reduce the premium. on hazardous waste management and the amount of reportable hazardous waste.

SUMMARY

The present disclosure provides methods and systems for efficiently segregating hazardous topping and catalyst material from inert support media. Although reference is made to hazardous catalyst and topping material, it is to be understood that systems and methods disclosed herein may be used to separate hazardous materials from other hazardous materials and non-hazardous materials from other non-hazardous materials.

A first aspect of the disclosure provides a system for segregating a mixture of oxidizable catalyst material and inert support media. The system may include an enclosure configured to contain inert gas and a plurality of stacked screens disposed within the enclosure. The stacked screens may include openings that decrease in size from a top of the stack to a bottom of the stack. The enclosure may include a mixture inlet positioned to enable delivery of the mixture to an uppermost stacked screen. The system may further comprise at least one motor for moving the stacked screens to cause the oxidizable catalyst material to separate from and migrate to a location beneath the inert support media; at least one inert support media outlet associated with at least one of the plurality of stacked screens and for conveying the separated inert support media to a location outside the enclosure; a catalyst material outlet associated with at least another of the plurality of stacked screens for conveying the separated oxidizable catalyst material to a location outside the enclosure; and an inert gas inlet associated with the enclosure for conveying the inert gas to the enclosure. The inert gas displaces oxygen within the enclosure to thereby limit oxidation of the oxidizable catalyst while the at least one motor moves the plurality of stacked screens.

Another aspect of the disclosure provides a method for disposing a mixture of oxidizable catalyst material and inert support media. The method may include introducing inert gas into an enclosure; introducing the mixture into the enclosure; separating the oxidizable catalyst material and the inert support media within the enclosure; maintaining an inert gas environment around the oxidizable catalyst material during separating; exporting the separated inert support media from the enclosure; and grinding the separated oxidizable catalyst material into a powder for disposal as hazardous waste via incineration.

Yet another aspect of the disclosure provides a method for disposing of a mixture of oxidizable catalyst material and inert support media. The method may include introducing inert gas into an enclosure, wherein the enclosure contains a plurality of stacked screens having openings that decrease in size from a top of the stack to a bottom of the stack; introducing the mixture to an uppermost one of the plurality of stacked screens; moving the plurality of stacked screens to cause the oxidizable catalyst material to separate from and migrate to a location beneath the inert support media; conveying the separated inert support media to a location outside the enclosure for disposal as non-hazardous waste; and conveying the separated oxidizable catalyst material to a location outside the enclosure for at least one of reclamation, thermal destruction, thermal processing, regeneration and/or disposal in a landfill.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
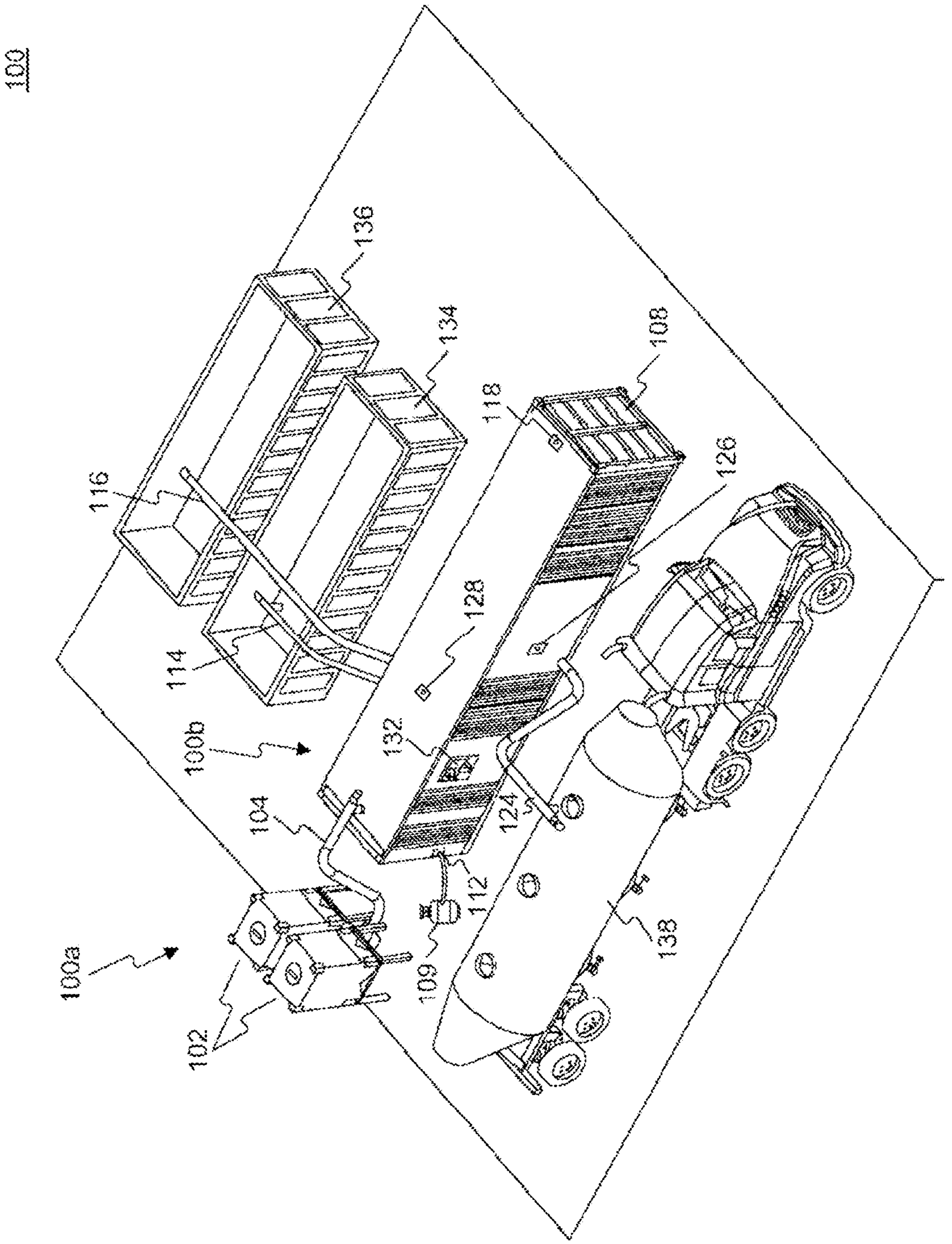
FIG. 1 is a perspective view of a system for segregating a mixture of oxidizable catalyst material and inert support media in accordance with embodiments of this disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Some embodiments of this disclosure may involve systems and methods for segregating materials in a mixture. Although embodiments of the current disclosure may be used to segregate (or separate) one or more constituent materials of any type of mixture, in the discussion that follows, an exemplary embodiment of segregating or separating constituent materials of industrial waste is described. Industrial waste for example, may include petrochemical refinement waste, which while classified as hazardous, may be made up of both hazardous and non-hazardous components. The non-hazardous components may include an inert material, such as inert support media made of, by way of example, alumina, ceramic or silica. The hazardous components may include an oxidizable catalyst and grading material. Together, these components may form a mixture. If the catalyst can be separated from the inert materials, the inert materials can be sold, recycled, or disposed of as non-hazardous waste, reducing the overall disposal cost. Moreover, in some instances, the catalyst, if separated from the inert materials, might be reclaimed and reused, lowering overall processing costs. In other instances, the catalyst may be disposed of, such as through incineration.

The term "catalyst" as used herein refers includes any of a variety of catalyst materials that are used in the refinement of oil, including but not limited to those listed in Table 1 below. It should be noted that the materials listed in the table are only exemplary, and in general, the catalyst may include any currently used or later developed catalyst material.

TABLE 1

| | | | | | |
|---|---|---|---|---|---|
| Z-863 TL (1.6) | TK-550 | NK-621 | ICR 179 LAQ | HOP-603K | CatTrap 10 |
| Z-853 TL (2.5) | TK-527 | NDXi | ICR 178NAQ | HOP-492K | C-411 |
| Z-853 TL (1.6) | TK-47 | N-205 1.5Q | ICR 168NAQ | HC-80 | AT792 |
| Z-803 TL (1.6) | TK-453 | MaxTrap (Ni, V) VGO | ICR 160 LAQ | HC-53LT | AT775 |
| Z-753 CY (2.8) | TK-45 | MaxTrap (Ni, V) | ICR 154NAQ | HC-26L | AT724G |
| Z-753 CY (1.6) | TK-439 | MaxTrap (As) | ICR 141N84 | HC-24L | AT580 |
| Z-503 TL (2-5) | TK-437 | LK-823 | ICR 141LY8 | HC-150LT | AT575 |
| Z-503 TL (1-3) | TK-431 | LK-821-2 | ICR 141LY4 | HC-120LT | AT535 |
| UF-210 | TK-341 | LK-813 | ICR 141LY2 | GSK-9 | AT514 |
| TK-951 | TK-339 | LK-811 | ICR 141LW8 | GSK-6A | AT510 |
| TK-943 | TK-30 | KG-6-3Q | ICR 141LW4 | GSK-19 | AT505 (All Sizes) |
| TK-941 | TK-261 | KG-55 | ICR 141LW2 | GN-863 TL (2.5) | AT505 |
| TK-931 | TK-250 | KG5-2Q/3Q | ICR 141LAQ | GC-862 TL (2.5) | AT405 1/10" |
| TK-928 | TK-25 Top Trap | KG-1-5B | ICR 141 LW8 | DN-3551 TL 1.3 | AT405 |
| TK-926 | TK-224 | KF-905 | ICR 141 LW4 | DN-3531 TL | ASCENT DC-2531 |
| TK-925 | TK-222 | KF-902 | ICR 141 LW2 | DN-3310 TL | AR-401, 11 × 6 |
| TK-915 | TK-220 | KF-901-3Q | ICR 141 LAQ | DN-3300 TL | AR-301, 4.5 × 4.5 |
| TK-911 | TK-15 | KF-901-1.5E | ICR 139Q01 | DN-3120 TL | AFS-1050 |
| TK-907 | TK-10 | KF-859-2Q | ICR 139 Q01 | DN-3110 TL | AFS-1025 |
| TK-831 | support | KF-859-1.5Q | ICR 132NAQ | DN-3100 TL | AFS-1010 |
| TK-799 | SK-201-A | KF-857 | ICR 122ZSF | DN-200 TL | ADS-120 |
| TK-797 | SK-201-2 | KF-848-2Q | ICR 122ZSB | DN-200 | ACT-989 |
| TK-773 | RN-412 TL (2.5) | KF-848-1.3Q | ICR 122 ZSB | DN-140 TL | ACT-951 |
| TK-753 | RN-412 TL (1.3) | KF-846-3Q | ICR 114(All Sizes) | DN-140 | ACT-931 |
| TK-743 | RN-412 | KF-846-1.3Q | ICR 114 NAQ | DHC-39LT | ACT-070 (inert) |
| TK-733 | RM-5030 TL (5.6) | KF-844 | ICD 132 NAQ | DD-431 | ACT-068 (inert) |
| TK-719 | RM-5030 TL (2.5) | KF-843 | HTZ-5 | DC-2551 1.3 | 834 HC (8.0) |
| TK-711 | RM-5030 TL (1.6) | KF-841-3Q | HTZ-3 | DC 2533 | 834 HC - 8 |
| TK-710 | RM-5030 TL (1.3) | KF-841-1.5Q | HT-86TL | DC-2532 | 815 HC (6.4) |
| TK-709 | RM-5030 | KF-840-3Q | HT-80R | DC-2531 TL | 815 HC (4.8) |
| TK-607 | RKS-5-7H, 16 × 11 | KF-767 | HT-428 | DC-2318 TL | 815 HC - 6.4 |
| TK-605 BRIM | RKNGR, 4.5 × 4.5 | KF-757-3Q | HR-945 | DC-2118 TL | 815 HC - 4.8 |
| TK-576 BRIM | RK-212, 16 × 11 | KF-757-1.5E | HR-845 | DC-130 | 814 HC |
| TK-575 BRIM | RK-212 | KF-756 | HR-841 | CR-55 | 720X |
| TK-574 | RK-211, 16 × 11 | KF-752 | HR-806S | CENTINEL GOLD DN-3330 | 534 SH (8.0) |
| TK-573 | RK-202, 16 × 11 | KF-648-3Q | HR-626 | CENTINEL GOLD DN-3310 | 534 SH (4.0) |
| TK-570 BRIM | RK-202 | KF-648-1.3Q | HR-568 | CENTINEL GOLD DN-3300 | 514 SH |
| TK-565 | RK-201, 16 × 11 | KF-647-3Q | HR-538 | CENTINEL GOLD DC-2318 | 234 TL (3.2) |
| TK-562 | RK-201 | KF-647-1.3Q | HR-448 | CENTINEL DN-3120 | 855 |
| TK-561 BRIM | R-67-7H, 16 × 11 | KF-542-5R/9R | HR-426 | CENTINEL DN-3110 | 834 |
| TK-561 | R-67-7H | KF-542-5Q | HR-416 | CENTINEL DN-3100 | 815 |
| TK-560 | PK-7R | KF-124LD | HR 468 | CENTINEL DC-2118 | 534 |
| TK-559 BRIM | OptiTrap 855 MD | InterLayer (CoMo) | HOP-802K | CDXi | 465 |
| TK-558 BRIM | OptiTrap (Ring) HC 6.4 | ICR 210L | HOP-802 | CDX | 234 |
| TK-554+ | OptiTrap (Ring) | ICR 210 L | HOP-608K | CatTrap 65 | |
| TK-553 | OptiTrap (Medallion) | ICR 179(All Sizes) | HOP-606HK | CatTrap 50 | |
| TK-551 | OptiTrap (MacroRing) | ICR 179 NAQ | HOP-606H | Ca; Trap 30 | |

The term "segregating." as used herein, refers to separating (or to a process used to separate) one or more constituents of a mixture. For example, in the exemplary embodiment described below, segregating may include separating oxidizable catalyst from inert support media in a mixture or a process where oxidizable catalyst is separated from inert support media, or vice versa. While some embodiments in this disclosure employ screen devices for segregating, in the broadest sense, the methods of this disclosure are not limited to any particular segregation structure. Alternative structures for separating materials by size or composition may be employed within the broad scope of this disclosure.

The term "inert gas," as used herein, refers to a gas that does not undergo a chemical reaction under the prevailing conditions. As would be recognized by a person of ordinary skill in the art, inert gases may include elemental gases, such as, for example, nitrogen and noble gases, or may include compound gases (i.e., a mixture of gases that does not undergo chemical reaction under prevailing conditions).

The systems and methods described herein may be provided on site at a refinery, in proximity to a refinery, in proximity to a remote waste treatment or reclamation facility, or at a remote waste treatment or reclamation facility. Thus, while the present disclosure is not limited to mobile segregation systems, in some disclosed embodiments, segregation systems may be mobile or may be constructed of components that may be movable.

One example of a system for segregating a mixture of oxidizable catalyst material and inert support material may include segregation component 100*b* depicted in FIG. 1. As described herein in greater detail, the segregation component 100*b* may include various components for segregating a mixture of oxidizable catalyst material and inert support media. In other embodiments, a system may include additional components, such as delivery• component 100*a*, an inert material collection container 134 and one or more catalyst collection containers 136, 138 along with interconnected conveyors, as is described later in greater detail.

Some disclosed embodiments may include an enclosure configured to contain inert gas. One challenge in handling some oxidizable materials is that they may become volatile when exposed to air. Thus, in some embodiments, segregation of inert support media and oxidizable catalyst material may occur in any container capable of receiving an inert gas and minimizing catalyst oxidation to an acceptable level (for example, to a level sufficient to reduce unacceptable risk). The container may have a lid, but need not have any particular form nor be made of any particular material, so long as it enables a sufficient amount of oxygen in the enclosure to be replaced by an inert gas while the segregation is taking place.

Figure 2:
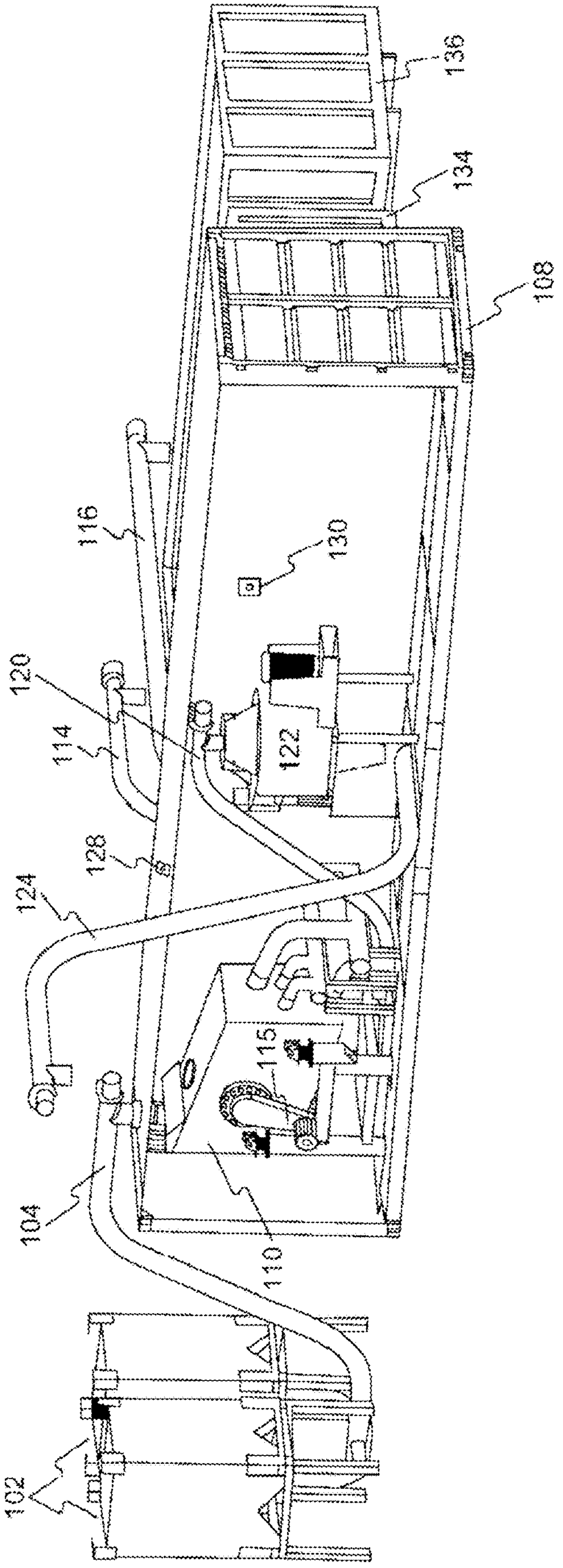
FIG. 2 is a partial cut-away view of the assembly depicted in FIG. 1.

For example, in FIG. 1, enclosure 108 of segregation component 100*b* may be a modified shipping container that is capable of being transported by a vehicle. Although not necessarily hermitically sealed, enclosure 108 may be designed to retain enough inert gas and/or exclude enough oxygen to enable a segregation process while minimizing the risk of setting off a dangerous catalyst oxidation reaction. In some embodiments, enclosure 108, may be provided with sealing material to enhance inert gas retention. Enclosure 108 may be pressurized using the inert gas. Inert gas 109 may be nitrogen or any other gas that does not induce a chemical reaction (e.g., a volatile reaction) when exposed to the mixture of catalyst and support media. Inert gas 109 may be contained in pressurized inert gas tank and may be fluidly coupled, or flow-connected, to the enclosure. In accordance with some embodiments, enclosure 108 may include one or more vents 118 for permitting gas within the enclosure to escape. Vents 118 may include openings, valves, filters, or any other mechanism suitable for allowing gas to escape enclosure 108 while limiting introduction of ambient oxygen into the enclosure. Enclosure 108 may also include an observation window 132 in an outer wall thereof, and an illuminator 130 (e.g., a light, etc.) (see FIG. 2) within the enclosure to enable external observation of the mixture segregation, as illustrated in FIG. 2. An observer may check the progress of the segregation process through the enclosure window if desired.

By way of one non-limiting example, FIG. 1 illustrates an exemplary system 100 for segregating a mixture of oxidizable catalyst material and inert support media. System 100 may include a delivery component 100*a* and a segregation component 100*b*. Delivery component 1.00*a* may include one or more flow bins 102 for containing the mixture of oxidizable catalyst material and inert support media therein. A conveyor 104 may deliver the mixture to segregation component 100*b*. The conveyor 104, may be of any construction capable of moving material. For example, it may include a belt conveyer, a slat conveyor, a toughed belt conveyor, a bucket conveyor, a screw conveyor, a vertical lift conveyor, a carton-track conveyor, a tow conveyor, a trolley conveyor, a sortation conveyor or any other mechanism capable of moving material from one location to another. In some embodiments (not shown) where the delivery component 100*a* is located above segregation component 100*b*, the conveyor may rely on gravity to feed segregation component 100*b*. In such instances, the conveyor may simply be a chute or a conduit through which the mixture flows by gravity. Alternatively, for example, a screw auger may be part of conveyor 104. In some embodiments, conveyor 104 may be enclosed or otherwise sealingly engaged with flow bins 102 to limit exposure of the catalyst to oxygen as the catalyst travels from delivery component 100*a* to segregation component 100*b*. Such limitation on oxygen exposure may be facilitated by a supply of inert gas to the system, as is described greater detail below.

In some embodiments, a mixture conveyor may include a controllable inlet for permitting selective passage of the mixture while limiting loss of inert gas. For example, conveyor 104 may be selectively isolatable (either completely or partially) from the delivery component 100*a* for maintaining an inert gas environment in a housing of conveyor 104. A gated inlet (not shown) may permit selective passage of the mixture into conveyor 104 while limiting loss of the inert gas. The gate may be either electronically or mechanically controlled so that when mixture is not passing into conveyor 104, the gate is closed. If electronic, a processor may control both the conveyor and the gate so that the gate opens to deliver mixture to a moving conveyor and closes thereafter to environmentally isolate the delivery component 100*a* from the conveyor 104. It is to be understood that reference herein to environmental isolation or an inert gas environment does not necessarily require hermetic sealing. Rather, a goal may simply be to reduce oxygen levels below a threshold level (for example, to below a level that poses an unacceptable risk of an adverse oxidation reaction).

With additional reference to FIG. 2, segregation component 100*b* may include enclosure 108, screen assembly 110, inert support media conveyor 114 and one or more catalyst material conveyors 116, 120. It is to be understood that the terms "inert support media conveyor" and "catalyst material conveyor" are illustrative and non-limiting. Conveyers 114, 116, and 120 may be utilized to transport other non-hazardous or hazardous materials depending on the composition of the mixture to be segregated. For example, where the mixture includes topping in combination with inert support media and catalyst, conveyors 116 and/or 120 may be utilized to transport both topping and catalyst. If for example, the mixture consists of only hazardous materials (e.g. topping and catalyst) one conveyor could be used to transport the larger of the hazardous components while one or more other conveyors could be used to transport the smaller hazardous components.

The entirety of segregation component 100*b* or components thereof may be portable so as to facilitate relocation between industrial sites. An inert gas inlet may be associated with the enclosure to permit the inert gas to enter the enclosure to displace oxygen within the enclosure to thereby limit oxidation of the oxidizable catalyst while the at least one motor moves the plurality of stacked screens. Here, the term "associated with" means disposed on, in, in proximity to, or otherwise positioned to enable inert gas to enter the enclosure. "Inlet" refers to any opening, valve, port or other construct for allowing inert gas to flow into the enclosure. By way of example with respect to FIG. 1, enclosure 108 may include an inert gas inlet 112 for receiving inert gas 109. Inert gas inlet 112 may be located in a lower portion of the enclosure to enable the inert gas to flow over the catalyst material and exit the enclosure through a top portion of the enclosure. In this way, inert gas is permitted to blanket the catalyst and thereby limit the risk of oxidation.

Some disclosed embodiments may include a plurality of stacked screens within the enclosure, the stacked screens having openings that decrease in size from a top of the stack to a bottom of the stack. As used herein, the term "screen" includes any structure with openings therein through which material smaller than the sizes of the openings may pass. For example, a screen may have a lattice or woven structure, formed of strips, wire or any other material. A screen may include a surface perforated with holes. A series of spaced apart bars may constitute a screen as may a sheet of metal, carbon fiber, or other material with openings therethrough. Indeed, any surface regardless of shape or structure may constitute a screen so long as it permits some sizes of materials to pass through while retaining larger sized materials.

Screens are considered stacked if they assume an arrangement whereby one screen is positioned above at least one other screen, regardless of the distance between them. Typically, the distance between two stacked screens should be at least sufficient to allow material on an upper screen to pass through to a lower screen. Any number of screens may constitute a stack. The sizes of the openings in lower screens may be smaller than the size of the openings of upper screens. In this way, larger pieces of material may be retained on an upper screen, while smaller pieces fall through to a lower screen. Stacked screens may be parallel to one another, sloped, or combinations thereof.

Thus, a "screen" may include any porous or perforated stackable structure capable of separating a material mixture into discrete components. In one embodiment, each screen may include a metallic mesh having holes or openings, and a stack of screens may include screens with holes or openings that decrease in size from a top of the stack to a bottom of the stack. The openings in the screens may have any shape or configuration (round, rectangular, square, etc.). For example, an uppermost screen of the stack (or a first screen) may define a plurality of holes having a size (or diameter) D1, a second screen below the first screen may define a plurality of holes having a size (or diameter) D2, and a third screen below the second screen may define a plurality of holes having a size (or diameter D3), such that D1>D2>D3. In general, any number of screens may be stacked together. In some embodiments, the number of screens in a stack may correspond to the number of differently sized components to be segregated (e.g., three screens for three differently sized components). For example, if the mixture includes three components to be segregated, D1 may be sized such that the largest of the three components is blocked by the first screen and the other two smaller sized components are allowed to pass through to the second screen. A size D2 of the openings in the second screen may be such that the second largest component is blocked, thereby allowing the smallest component to pass through to the third screen. Information relating to the number of screens may be obtained in advance, e.g., based on the loading plan of the refinery, or determined on site. This configuration allows for the smaller sized hazardous components, e.g., catalyst and topping material, to filter down through the stack and the larger inert support media to remain in a separate upper portion of the stack. Diameter DI may be smaller than the size (e.g., diameter) of the inert support media, which may range in size, for example from 2 mm-2 in., including: 2-4 mm, 5-7 mm, 9-11 mm, 11-13 m, 14-17 mm, 18-21 mm, 23-27 mm, 36-40 mm, 46-50 mm, ⅛ in., ¼ in., ⅜ in., ½ in., 1 in., 1.5 in, and 2 in.

Figure 3A:
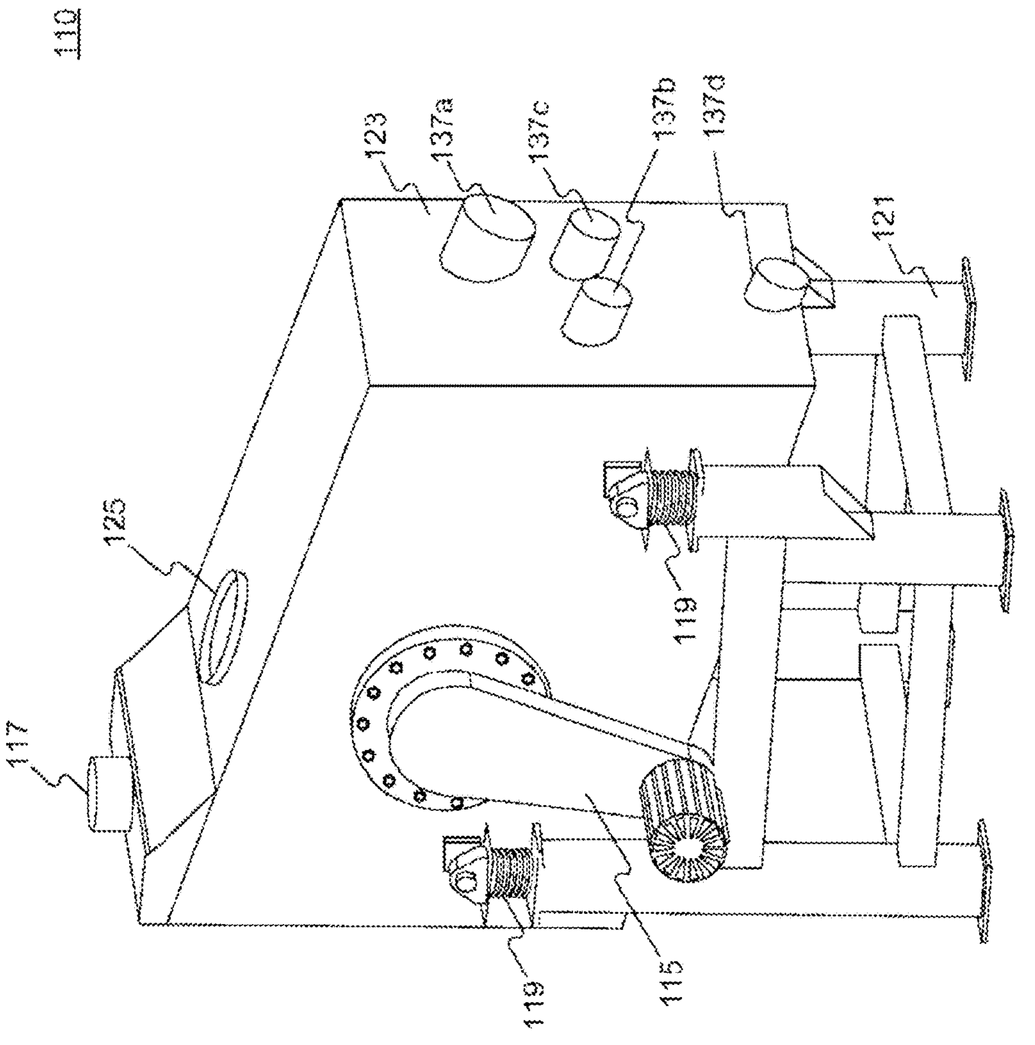
FIG. 3A is a detailed view of the screen assembly illustrated in FIG. 1.
Figure 3B:
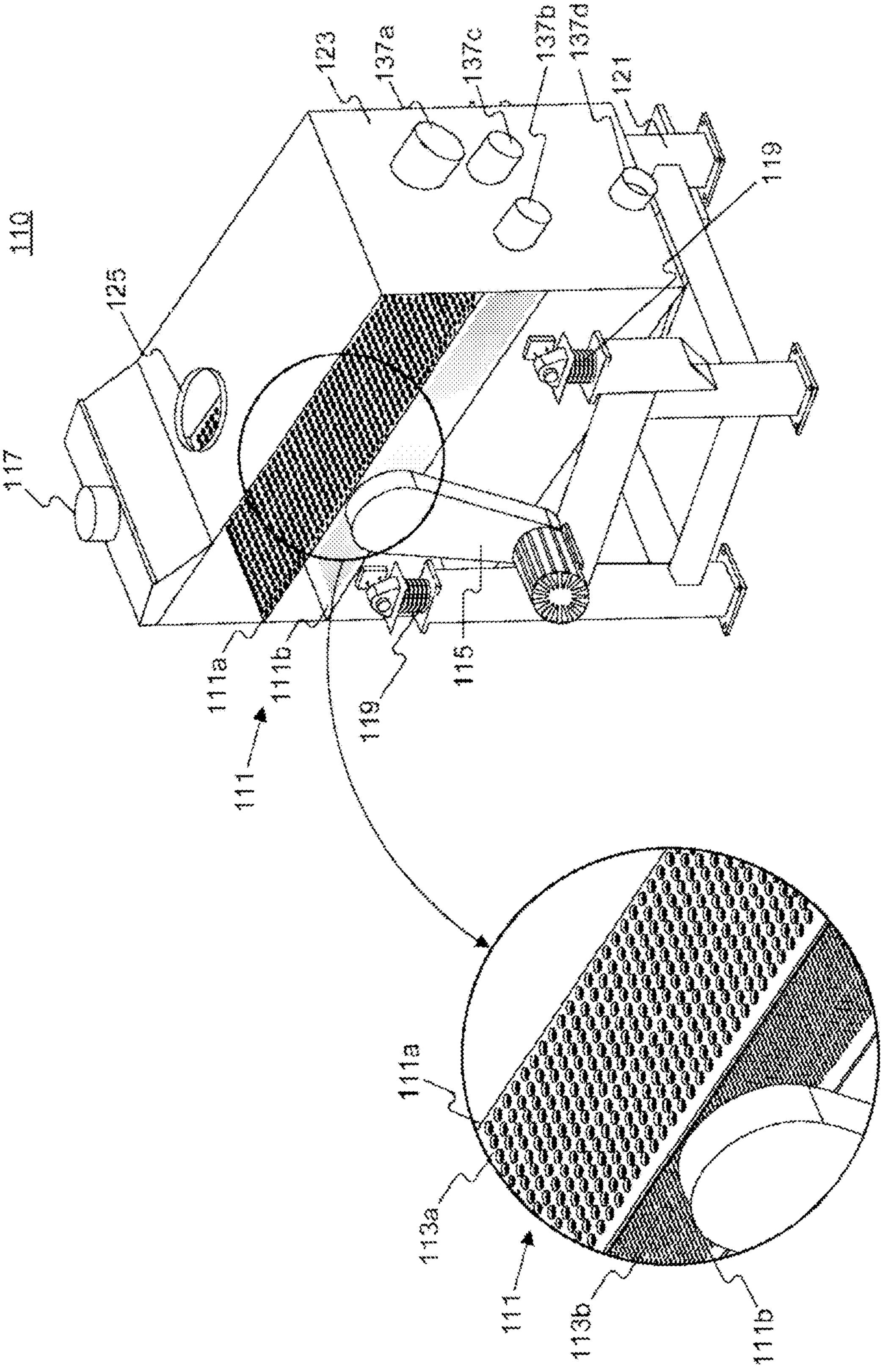
FIG. 3B is a partial cut-away view of the screen assembly illustrated in FIG. 3A.

By way of example, with reference to FIGS. 3A-3B, screen assembly 110 includes a plurality of stacked screens 111 (including screens Illa, 111*b*$_e$ etc.) configured to separate the inert support media from one or more hazardous components. The hazardous components of the mixture are smaller in diameter than the inert support material and therefore pass through openings 113*a* in screen 111*a* and onto lower screen 111*b*. In some embodiments, screens 111*a* and 111*b* may be sloped to allow separated inert and hazardous components to collect at the bottom. of their corresponding screens. The screen assembly 110 may include a base 121 on which the screens and their associated housing 1.23 are supported. A plurality of springs 119 may be disposed between the screen housing 123 and the base 121. to absorb the shock of falling material and screen vibrations. Housing 123 may define sidewalls to which a motor 115 may be attached. In some embodiments, a sidewall may fully enclose a side of the housing 123, as illustrated for example in FIG. 3A. In some embodiments, the sidewall may only partially enclose a side of the housing such that cleaning, maintenance, or adjustments to the screens may be made through a side of the housing. A mixture of inert and hazardous material may enter screen assembly 110 through inlet 117 at the top of the screen assembly 110 and fall onto the topmost screen of the plurality of stacked screens 111 (i.e., screen 111*a*). Maintenance and cleaning may also be performed through a port 125 at a top of the screen assembly. It should be noted that although only one inlet 117 is illustrated in the figures, in some embodiments, multiple inlets may be provided.

At least one inert support media outlet may be associated with at least one of the plurality of stacked screens. The inert support media outlet may direct the separated inert support media to a location out of the enclosure. Here, the term "associated with" means positioned or otherwise oriented to permit inert support media to be transferred from at least one of the stacked screens to a location outside of the enclosure. "Outlet" refers to any opening, conduit, hole, port, valve or other construct for allowing inert support media to be removed from the screen. In some embodiments, the outlet may be formed on housing 123 of screen assembly 110. One or more outlets may be used to achieve this purpose. In some embodiments, an air lock (not shown) may be associated with the inert support media outlet. The air lock may limit the amount of inert gas leaving the enclosure via the inert support media outlet. As used herein, "air lock" means any structure for restricting or completely preventing inert gas from leaving the enclosure. By way of example, FIG. 3A, illustrates an inert support media outlet 137*a* disposed on an outer surface of housing 123. Outlet 137*a* may be positioned to intersect with support media that has collected at a bottom of screen 111*a*. Screen 111*a* may be sloped toward outlet 1.37*a* such that inert support media at the intersection exits through outlet 137*a*. Although one outlet 137*a* is depicted, in general, any number of outlets may be provided.

A catalyst material outlet may be associated with at least another of the plurality of stacked screens. The catalyst material outlet may direct the separated oxidizable catalyst material to a location outside the enclosure. Here, the term "associated with" means positioned or otherwise oriented to permit oxidizable catalyst material to be transferred from another screen to a location outside of the enclosure. One or more outlets may be used to achieve this purpose. An air lock (not shown) may also be associated with the catalyst material outlet. The air lock may limit the amount of inert gas leaving the enclosure via the catalyst material outlet. By way of example, catalyst material outlets 137*b* and 137*c* may be disposed on an outer surface of housing 123. Outlets 137*b* and 137*c* may be positioned to intersect with oxidizable catalyst material that has collected at a bottom of screen 111*b*. Screen 111*b* may be sloped toward outlets 137*b* and 137*c* such that oxidizable catalyst material at the intersection exits through the outlet. Where topping is also incorporated in the mixture, topping may also collect at the intersection of outlet 137*b* and 137*c* before exiting therethrough.

To facilitate separation, at least one motor may be utilized for moving the stacked screens to cause the oxidizable catalyst material to separate from and migrate to a location beneath the inert support media. The motor may be electrical and operated remotely or directly, e.g., by switch. The term "motor," as used herein, may refer to any electrical mechanism for inducing vibration of the screens. The intensity and/or duration of the vibration may be adjusted to reflect the load of the mixture. For example, stronger vibrations may be used to facilitate separation of large mixture loads. Alternatively, vibration intensity may remain constant, but for a longer duration to facilitate separation. The motor may be automated, such that the vibrations begin and/or end at a certain time or when the load on the screen reaches a predetermined threshold. By way of one non-limiting example, FIG. 3A illustrates a motor 11.5 disposed on a sidewall of the housing 123 of screen assembly 110. One having ordinary skill in the art will understand that the motor may be placed at any of a variety of locations with respect to the screen assembly, so long as its placement is sufficient to enable movement of the screens and thus separation of the catalyst and support media.

In accordance with some embodiments, inert support media conveyor 114 may be secured to enclosure 108 via outlet 137*a* such that it collects the separated inert support media. Although only one such conveyor is shown, it is to be understood that additional inert support media conveyors (and corresponding outlets) may be utilized to collect inert support media from screen assembly 110. Catalyst material conveyor 116 may be secured to enclosure 108 via outlet 137*b* and 137*c* such that it collects the separated catalyst material. Alternatively, outlets 137*b* and 137*c* may each be secured to a catalyst material conveyor, as illustrated in FIG. 2, to enable more rapid transport of the catalyst. Due to the smaller size of the catalyst material component, conveyor 116 may be secured to a lower section of the enclosure corresponding to a position of a bottom most screen; however, this configuration may be altered depending on the size of the components to be separated. Conveyors 114 and 116 may also use screw elevation (or any of the means discussed above with respect to conveyor 104) to transport the separated components out of the enclosure and to a desired location. Separated inert support media may be transported, for example from conveyor 114 to receptacle 134 for recycling or disposal, while separated catalyst material may be transported to another receptacle 136 for reclamation, regeneration or landfill disposal as illustrated in FIG. 1.

In some embodiments, system 100 may include one or more sensors for detecting a reduction of oxygen in the enclosure and a regulator for at least periodically supplying additional inert gas to the enclosure to account for loss of the inert gas. As used herein, "sensor" means any device, module, machine, or system for directly or indirectly measuring, detecting, sensing, recording or storing oxygen concentration. The sensor may be located on an outer surface of the enclosure, within the enclosure, or at any other locale suitable for measuring, detecting, recording or storing the concentration of oxygen within the enclosure. Where the sensor is located within the enclosure, an observer may check a measurement of the sensor, via, e.g., window 132. The regulator may be manually operated by an observer or automated to supply inert gas when the level of inert gas within the enclosure falls below a predetermined threshold. In some embodiments, the sensor measures, detects, records and/or stores an oxygen concentration within the enclosure and signals the regulator to begin or stop supplying inert gas depending on the measured oxygen concentration. In this way, the sensor and regulator work together to automatically monitor and manage the level of oxygen in the enclosure. By way of example, FIG. 1 depicts a regulator 126 disposed on an outer surface of the enclosure and a sensor 128 on a top of surface of the enclosure.

System 100 may also include a grinder for grinding the separated oxidizable catalyst material into a powder. In accordance with some embodiments, the grinder may be located in a region supplied with the inert gas, including, by way of example, the inside of the enclosure. The grinder may also be stationed at a remote location so long as the catalyst is supplied with inert gas to prevent the pulverized catalyst from oxidizing. The grinder may include an inlet for receiving catalyst from a catalyst conveyer. A ground catalyst conveyor may be associated with the grinder for transporting ground catalyst from the grinder for disposal.

By way of non-limiting example, FIG. 2 illustrates a catalyst conveyor 120, grinder 122, and ground catalyst conveyor 124. Catalyst conveyor 120 may be configured to transport catalyst from screen assembly 110 to grinder 122. In some embodiments, catalyst conveyor 120 may be connected to screen assembly 110 at, for example outlet 137*d*. Outlet 137*d* may receive catalyst from a lower-most screen of screen assembly 1.1.0 or directly from an accumulation of catalyst particles at the bottom of housing 123. Ground catalyst may be transported via ground catalyst conveyor 124 to a bin or other receptacle 138 for disposal via, e.g., incineration.

It is to be understood that the system may use one or both catalyst conveyors 116, 120 to dispose of catalyst. When both are in use, segregated catalyst particles of a first size may be transported for disposal via catalyst conveyor 116 while segregated catalyst particles of a second, smaller size maybe transported for disposal via catalyst conveyor 120. Further still, if the mixture contains topping in addition to the catalyst and inert support media, catalyst conveyor 116 may be used to transport topping while catalyst conveyor 120 may be used to transport catalyst.

Figure 4:
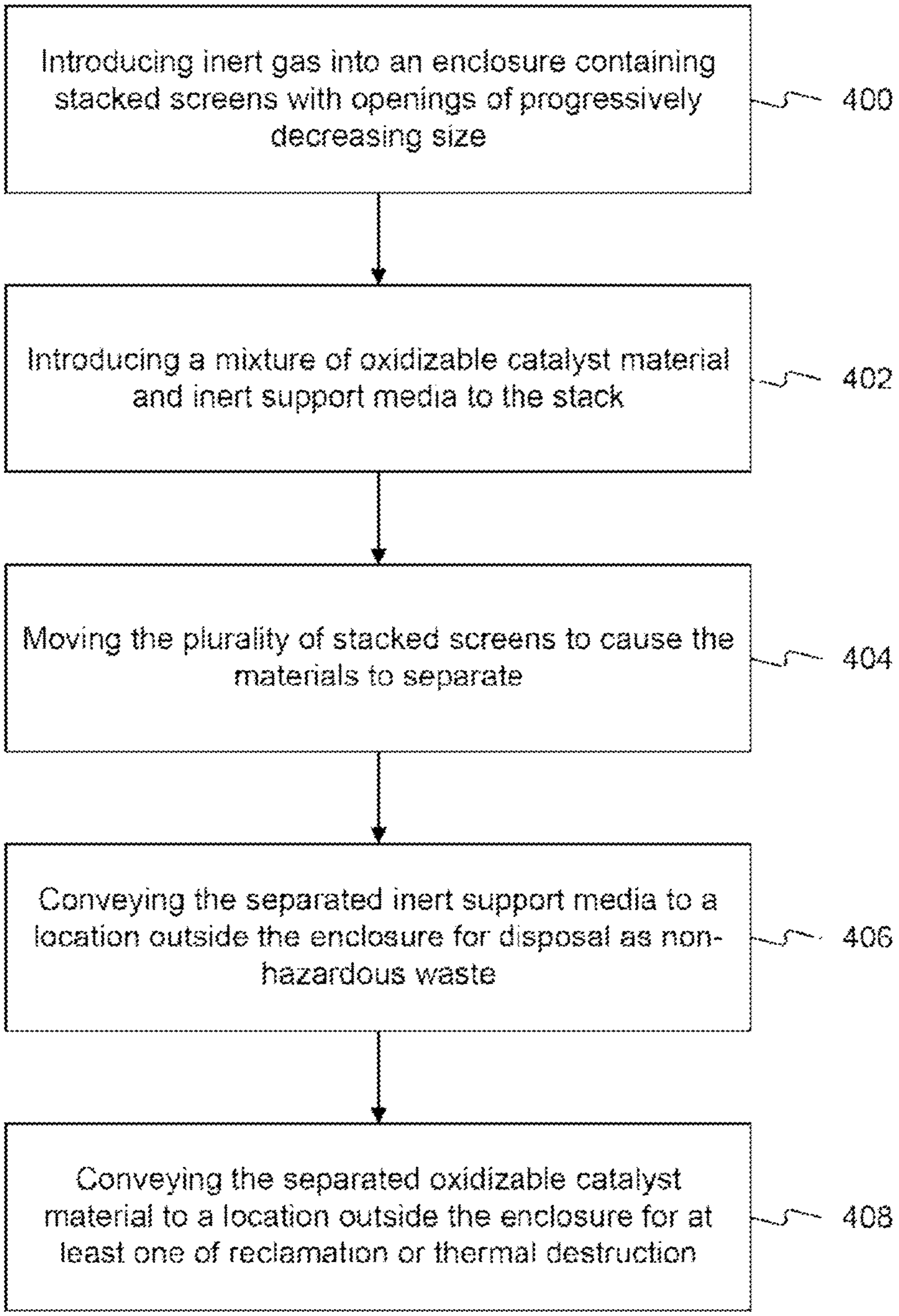
FIG. 4 is a block diagram of a first exemplary process in accordance with embodiments of this disclosure.

A method for disposing of a mixture of oxidizable catalyst material and inert support media will now be discussed with respect to the exemplary method illustrated in FIG. 4.

Beginning at step 400, inert gas is introduced into an enclosure. As discussed above, the enclosure may contain a plurality of stacked screens, each stacked screen having openings that decrease in size from a top of the stack to a bottom of the stack. The inert gas may be nitrogen and enter the enclosure 108 via inert gas inlet 112. Prior to or during this time, one or more flow bins 102 may be filled with a mixture of oxidizable catalyst material and inert support media. Enclosure 108 may be pressurized using the inert gas so as to displace oxygen within the enclosure.

At step 402, the mixture is introduced to an uppermost one of the plurality of stacked screens. The mixture may be transported directly from one or more flow bins 102 to the enclosure using, e.g., a gravity dump, or indirectly through conveyor 104 and into inlet 117 of screen assembly 110, where it drops onto uppermost screen 111*a*.

At step 404, the plurality of stacked screens are moved to cause the oxidizable catalyst material to separate from and migrate to a location beneath the inert support media. Motor 115 may be used to move the screens and thereby facilitate separation. The intensity and/or duration of the movement may be adjusted to reflect the load of the mixture; with longer durations and/or stronger movement being used to separate larger quantities of mixture.

Since the openings of adjacent screens, e.g., openings 113*a*, 113*b* of screens 111*a*, 111*b*, decrease in size from a top of the stack to a bottom of the stack, this movement causes the smaller catalyst material components to filter down through the stack while the larger inert support media component remains in a separate upper portion of the stack. Inert support media on uppermost screen 111*a* may collect at the bottom of the screen where the screen intersects with outlet 137*a*, while separated catalyst material at a bottom of the stack, for example on screen 111*b*, may collect where the screen intersects outlets 137*b* and 137*c*. It is to be understood that the mixture may alternatively be deposited onto a lower screen, e.g., a second or third highest screen, so long as a sufficient number of screens are utilized to enable separation of the differently sized mixture components.

At step 406, the separated inert support media may be conveyed to a location outside the enclosure for recycling or disposal as non-hazardous waste. Separated inert support media may collect at a bottom of screen 111*a*, then directed through outlet 137*a*, and into inert support media conveyor 114. Inert support media conveyor 114 may transport the separated inert support media to receptacle 134, after which it may be disposed of or repurposed as desired.

At step 408, separated oxidizable catalyst material may be conveyed to a location outside the enclosure for at least one of reclamation or thermal destruction. Separated oxidizable catalyst material may be directed to any one of outlets 137*b*, 137*c* and/or 137*d*. Where, for example, separated catalyst material is routed through outlets 137*b* and/or 137*c*, catalyst conveyor 116 may transport the separated catalyst to a receptacle 136 for reclamation and/or thermal destruction. If separated catalyst material is routed through outlet 137*d*, the catalyst may be ground as described in detail with respect to FIG. 5.

Figure 5:
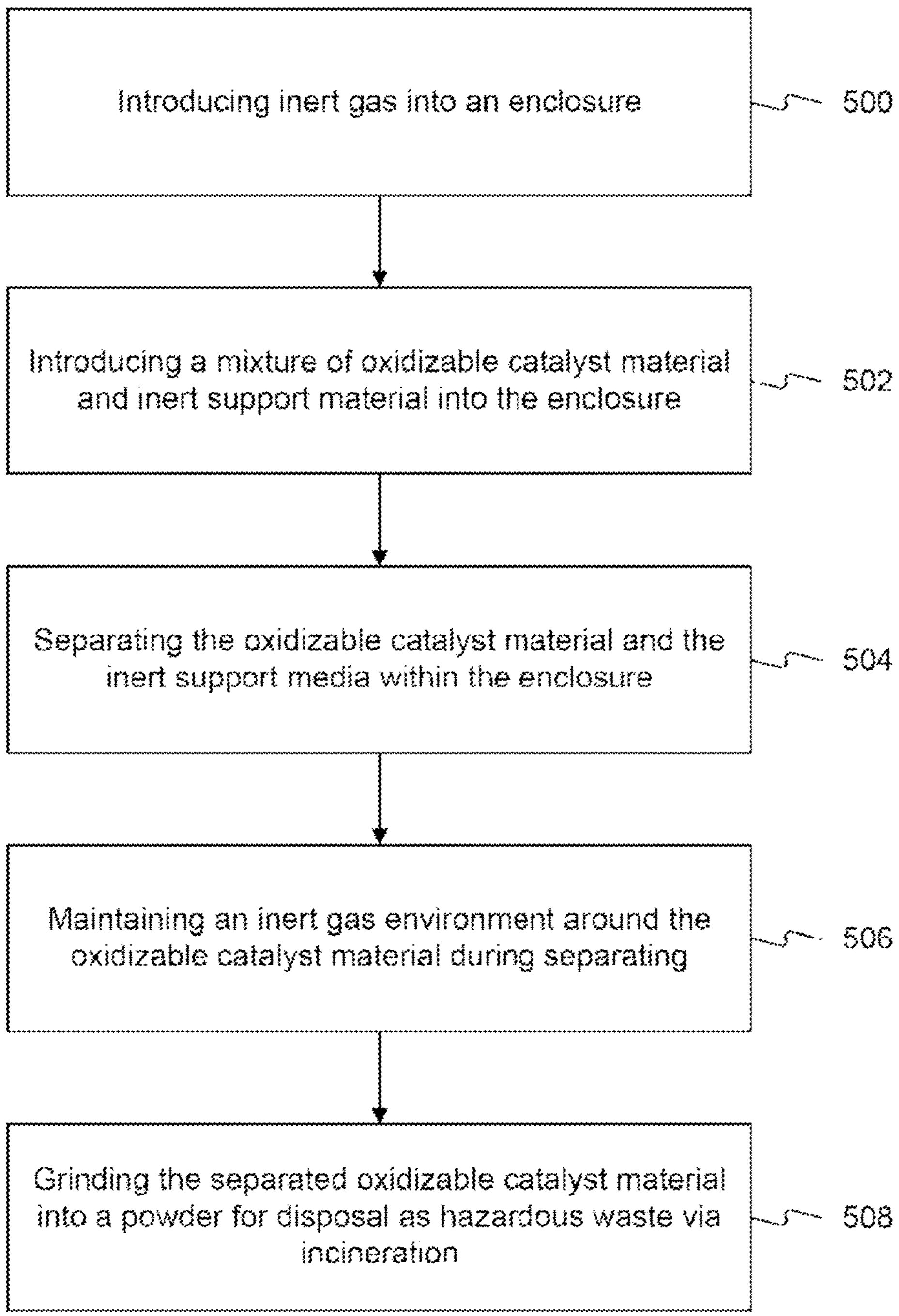
FIG. 5 is a block diagram of a second exemplary process in accordance with embodiments of this disclosure.

A method of disposing of a mixture of oxidizable catalyst material and inert support media will now be discussed with respect to the exemplary method illustrated in FIG. 5.

Beginning at step 500, inert gas is introduced into an enclosure. As discussed above, the enclosure may contain a plurality of stacked screens, each stacked screen having openings that decrease in size from a top of the stack to a bottom of the stack. The inert gas may be nitrogen and enter the enclosure 108 via inert gas inlet 112. Prior to or during this time, one or more flow bins 102 may be filled with a mixture of oxidizable catalyst material and inert support media. Enclosure 108 may be pressurized using the inert gas so as to displace oxygen within the enclosure.

At step 502, the mixture is introduced into the enclosure. As described above with respect to 402, the mixture may be introduced into the screen assembly via inlet 117 and onto an uppermost one of the plurality of stacked screens. The mixture may be transported directly from one or more flow bins 102 to the enclosure using, e.g., a gravity dump, or indirectly through conveyors 104 and 106.

At step 504, the oxidizable catalyst material and the inert support media within the enclosure are separated. As with step 404, the plurality of stacked screens are moved to cause the oxidizable catalyst material to separate from and migrate to a location beneath the inert support media. Motor 115 may be used to move the screens and thereby facilitate separation. The intensity and/or duration of the movement may be adjusted to reflect the load of the mixture; with longer durations and/or stronger movement being used to separate larger quantities of mixture.

Since the openings of adjacent screens, e.g., openings 113*a*, 113*b* of screens 111*a*, 111*b*, decrease in size from a top of the stack to a bottom of the stack, this movement causes the smaller catalyst material components to filter down through the stack while the larger inert support media component remains in a separate upper portion of the stack. Inert support media on uppermost screen 111*a* may collect at the bottom of the screen where the screen intersects with outlet 137*a* while separated catalyst material at a bottom of the stack, for example on screen 11M, may collect where the screen intersects outlets 137*b* and 137*c*. It is to be understood that the mixture may alternatively be deposited onto a lower screen, e.g., a second or third highest screen, so long as a sufficient number of screens are utilized to enable separation of the differently sized mixture components.

At step 506, an inert gas environment is maintained around the oxidizable catalyst material during separating. A sensor for detecting a reduction of oxygen in the enclosure and a regulator for at least periodically supplying additional inert gas to the enclosure, may be used to maintain the inert gas environment. The regulator may be manually operated by an observer or automated to supply inert gas when the level of inert gas within the enclosure falls below a predetermined threshold. The sensor may measure an oxygen concentration within the enclosure and signal the regulator to begin or stop supplying inert gas depending on the measured oxygen concentration. In this way, the sensor and regulator work together to automatically monitor and manage the level of oxygen in the enclosure.

At step 508, the separated inert support media is exported from the enclosure. As with step 406, the separated inert support media may be conveyed to a location outside the enclosure for recycling or disposal as non-hazardous waste. Separated inert support media may collect at a bottom of screen 111*a*, where it is then directed through outlet 137*a*, and into inert support media conveyor 114. Inert support media conveyor 114 may transport the separated inert support media to receptacle 134, after which it may be disposed of or repurposed as desired.

At step 510, the separated oxidizable catalyst material is ground into a powder for disposal as hazardous waste via incineration. Separated catalyst material is routed through outlet 137*d*, which is connected to catalyst conveyor 120. Catalyst conveyor 120 transports the separated catalyst to a grinder 122. Once ground, the ground catalyst may be transported via ground catalyst conveyor 124 to a receptacle 138 for reclamation and/or thermal destruction. The receptacle may be secured to a vehicle for immediate transportation as illustrated in FIG. 1 or loaded onto a vehicle at a later time.

Figure 6:
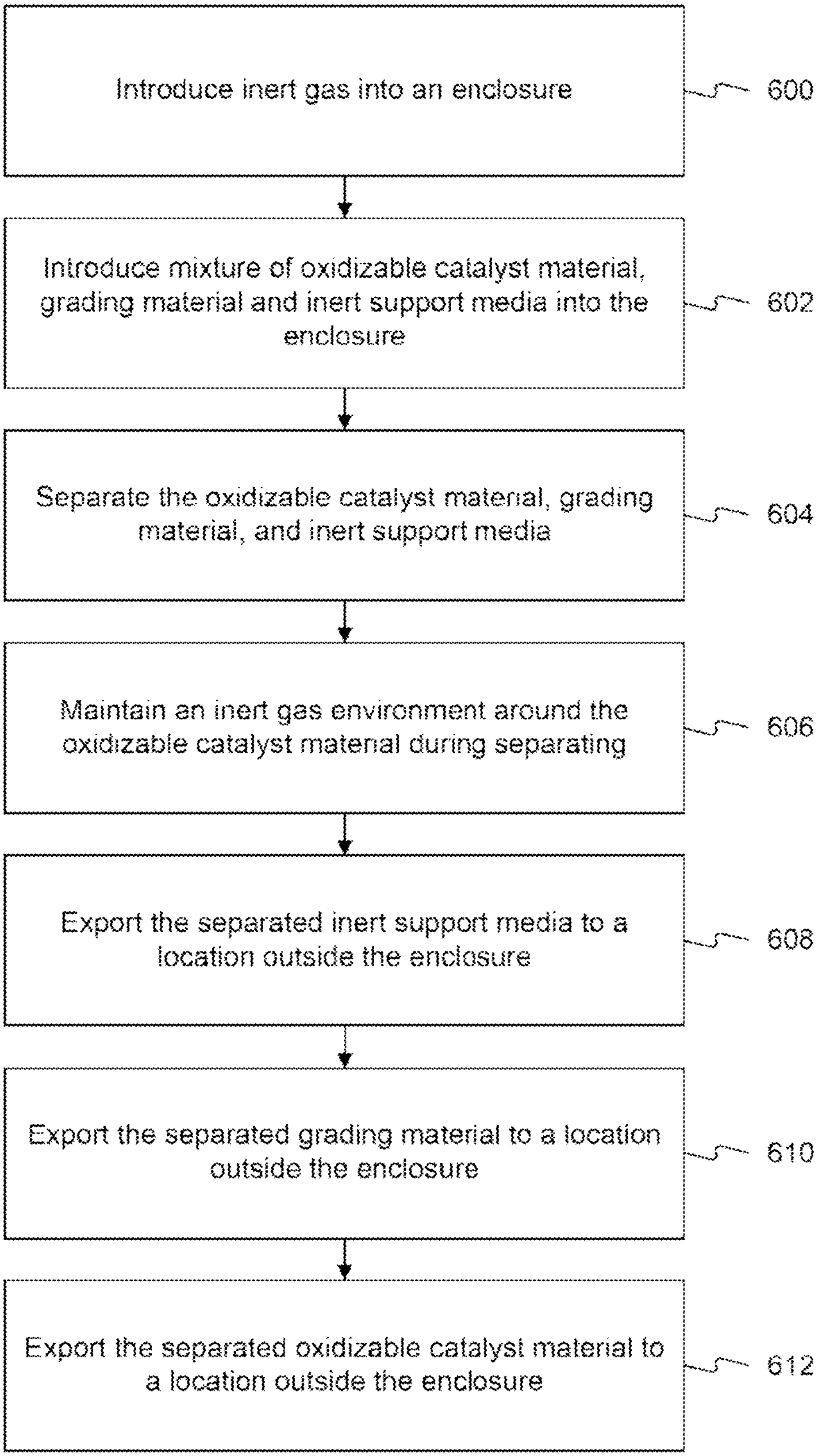
FIG. 6 is a block diagram of another exemplary process in accordance with embodiments of this disclosure.

A method of disposing of a mixture of oxidizable catalyst material and inert support media will now be discussed with respect to the exemplary method illustrated in FIG. 6.

Beginning at step 600, inert gas is introduced into an enclosure. As discussed above, the enclosure may contain a plurality of stacked screens, each stacked screen having openings that decrease in size from a top of the stack to a bottom of the stack. The inert gas may be nitrogen and enter the enclosure 108 via inert gas inlet 112. Prior to or during this time, one or more flow bins 102 may be filled with a mixture of oxidizable catalyst material and inert support media. Enclosure 108 may be pressurized using the inert gas so as to displace oxygen within the enclosure.

At step 602, a mixture of oxidizable catalyst material, grading material and inert support media are introduced into the enclosure. The mixture may be introduced into the screen assembly via inlet 117 and onto an uppermost one of the plurality of stacked screens. The mixture may be transported directly from. one or more flow bins 102 to the enclosure using, e.g., a gravity dump, or indirectly through conveyor 104.

At step 604, the oxidizable catalyst material, grading material and the inert support media within the enclosure are separated. As discussed above with respect to FIGS. 4 and 5, the plurality of stacked screens are moved, using, e.g., motor 115, to facilitate separation. The intensity and/or duration of the movement may be adjusted to reflect the load of the mixture; with longer durations and/or stronger movement being used to separate larger quantities of mixture.

Since the openings of adjacent screens, e.g., openings 113*a*, 113*b* of screens 111*a*, 111*b*, decrease in size from a top of the stack to a bottom of the stack, this movement causes the smaller grading and catalyst material components to filter down through the stack while the larger inert support media component remains in a separate upper portion of the stack. Inert support media on uppermost screen 111*a* may collect at the bottom of the screen where the screen intersects with outlet 137*a*, while separated catalyst and grading material at a bottom of the stack, for example on screen 111*b*, may collect where the screen intersects outlets 137*b* and 137*c*. If the grading and catalyst materials differ in size, a third screen may be utilized. In this case, the smaller, e.g., catalyst material will be permitted to filter through the second screen and onto the third screen. Alternatively, the smaller catalyst may be permitted to accumulate at a bottom of the screener$_e$ in which case an additional screen is not needed.

At step 606, an inert gas environment is maintained around the oxidizable catalyst material during separating. A sensor for detecting a reduction of oxygen in the enclosure and a regulator for at least periodically supplying additional inert gas to the enclosure, may be used to maintain the inert gas environment. The regulator may be manually operated by an observer or automated to supply inert gas when the level of inert gas within the enclosure falls below a predetermined threshold. The sensor may measure an oxygen concentration within the enclosure and signal the regulator to begin or stop supplying inert gas depending on the measured oxygen concentration. In this way, the sensor and regulator work together to automatically monitor and manage the level of oxygen in the enclosure.

At step 608, the separated inert support media is exported from the enclosure. As with step 406, the separated inert support media may be conveyed to a location outside the enclosure for disposal as non-hazardous waste. Separated inert support media may collect at a bottom of screen 111*a*, where it is then directed through outlet 137*a*, and into inert support media conveyor 114. Inert support media conveyor 114 may transport the separated inert support media to receptacle 134, after which it may be disposed of or repurposed as desired.

At step 610, grading material is conveyed to a location outside the enclosure. The separated material may be directed to outlet 137*b* and/or 137*c* and transported outside of enclosure 108 via conveyor 116 and into receptacle 136 for collection.

At step 612, separated oxidizable catalyst material is conveyed to a location outside the enclosure. Separated oxidizable catalyst material may be directed to any one of outlets 137*b*, 137*c* and/or 137*d*. Where, for example, separated catalyst material is routed through outlets 137*b* and/or 137*c*, catalyst conveyor 116 may transport the separated catalyst to receptacle 136. In some cases, the catalyst may be comingled with the grading material disposed of at step 610. If the catalyst material is routed through outlet 137*d* (for example, after passing through the second screen and onto a third screen or a bottom of the screening assembly as discussed above in step 604), the separated oxidizable catalyst material may ground into a powder for disposal as hazardous waste via incineration. Catalyst conveyor 120 transports the separated catalyst to a grinder 122. Once ground, the ground catalyst may be transported via ground catalyst conveyor 124 to a receptacle 138 for reclamation, regeneration and/or landfill disposal. The receptacle may be secured to a vehicle for immediate transportation as illustrated in FIG. 1 or loaded onto a vehicle at a later time.

Disclosed embodiments may include any one of the following bullet-pointed features alone or in combination with one or more other bullet-pointed features, whether implemented in connection with a device, a system, or a method:

a system for segregating a mixture of oxidizable catalyst material and inert support media an enclosure configured to contain inert gas a plurality of stacked screens within the enclosure, the stacked screens having openings that decrease in size from a top of the stack to a bottom of the stack a mixture inlet in the enclosure positioned to enable delivery of the mixture to an uppermost stacked screen at least one inert support media outlet associated with at least one of the plurality of stacked screens, wherein the at least one inert support media outlet directs separated inert support media to a location out of the enclosure a catalyst material outlet associated with at least another of the plurality of stacked screens, wherein the catalyst material outlet directs separated oxidizable catalyst material to a location outside the enclosure at least one motor for moving the stacked screens to cause the oxidizable catalyst material in the mixture to separate from and migrate to a location beneath the inert support, media an inert gas inlet associated with the enclosure for permitting the inert gas to enter the enclosure to displace oxygen within the enclosure and thereby limit oxidation of the oxidizable catalyst material while the at least one motor moves the plurality of stacked screens wherein the enclosure is configured for pressurization of the inert gas, wherein the inert gas inlet is located in a lower portion of the enclosure to enable the inert gas to flow over the oxidizable catalyst material and exit the enclosure through a top portion of the enclosure a sensor for detecting a reduction of oxygen in the enclosure a mixture conveyor for conveying the mixture to the mixture inlet, wherein the mixture conveyor is in flow communication with the enclosure and is enclosed to contain the inert gas at least one flow bin associated with an end of the mixture conveyor for supplying the mixture to the mixture conveyor, wherein the mixture conveyor is sealingly engaged with the flow bin and the enclosure to contain the inert gas wherein the mixture conveyor includes a screw auger wherein the mixture conveyor includes a controllable inlet for permitting selective passage of the mixture while limiting loss of the inert gas a regulator for at least periodically supplying additional inert gas to the enclosure to account for loss of the inert gas an air lock associated with the inert support media outlet for limiting the inert gas from. leaving the enclosure via the inert support media outlet an air lock associated with the catalyst material outlet for limiting the inert gas from leaving the enclosure via the catalyst material outlet a pressurized inert gas tank flow-connected to the enclosure wherein the enclosure and plurality of stacked screens are configured as a portable unit for movement between industrial sites a grinder for grinding the separated oxidizable catalyst material into a powder wherein the grinder is located in a region supplied with the inert gas wherein the grinder is contained within the enclosure and the mixture inlet is a hazardous waste inlet an observation window in an outer wall of the enclosure, and an illuminator within the enclosure to enable external observation of the mixture segregation wherein the inert gas tank contains nitrogen a method for disposing of a mixture of oxidizable catalyst material and inert support media introducing inert gas into an enclosure, wherein the enclosure contains a plurality of stacked screens, the stacked screens having openings that decrease in size from a top of the stack to a bottom of the stack introducing the mixture to an. uppermost one of the plurality of stacked screens moving the plurality of stacked screens to cause the oxidizable catalyst material to separate from and migrate to a location beneath the inert support media conveying the separated inert support media to a location outside the enclosure for disposal as non-hazardous waste conveying the separated oxidizable catalyst material to a location outside the enclosure for at least one of reclamation or thermal destruction wherein the thermal destruction includes disposal via incineration wherein the inert gas is nitrogen wherein introducing the mixture includes conveying the mixture in a closed conveyor containing the inert gas wherein conveying the separated oxidizable catalyst material to a location outside the enclosure includes conveying the separated oxidizable catalyst material in a closed conveyor containing the inert gas incinerating the separated oxidizable catalyst material in a cement kiln storing the separated oxidizable catalyst material for reuse in an industrial process storing the separated inert media for reuse in an industrial process wherein conveying the separated oxidizable catalyst material and inert support media. to a location outside the enclosure includes using a screw auger sensing oxygen presence within the enclosure wherein the enclosure maintains an inert gas environment around the oxidizable catalyst a method of disposing of a mixture of oxidizable catalyst material and inert support media.

introducing inert gas into an enclosure introducing the mixture into the enclosure separating the oxidizable catalyst material and the inert support media within the enclosure maintaining an inert gas environment around the oxidizable catalyst material during separating exporting the separated inert support media from the enclosure grinding the separated oxidizable catalyst material into a powder for disposal as hazardous waste via incineration wherein the grinding occurs in an inert gas environment wherein introducing the mixture into the enclosure includes removing the mixture from. a refinement container and transferring the mixture to the enclosure via a conveyor wherein the inert gas is nitrogen wherein the separated oxidizable catalyst material is ground into a powder for suspension in a liquid fuel for a cement kiln, wherein the enclosure is movable and wherein the method further includes moving the enclosure to an industrial site wherein the mixture further comprises grading material; and separating the grading material from the inert support media exporting the grading material from the enclosure wherein the grading material is exported with the oxidizable catalyst material wherein the grading material is exported separately from the oxidizable catalyst material Although system 100 is described as being used to separate refinery waste (e.g., inert material from catalyst) in a mixture, as explained previously, this is only exemplary. In general, the systems and methods of the current disclosure may be used to separate or segregate the constituent components of a mixture in any application. While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A system for segregating a mixture of oxidizable catalyst material, grading material, and inert support media, comprising:

an enclosure configured to contain inert gas;

a plurality of stacked screens within the enclosure;

at least one mixture inlet in the enclosure positioned to enable delivery of the mixture to an uppermost stacked screen of the plurality of stacked screens;

at least one motor capable of moving the plurality of stacked screens to cause the oxidizable catalyst material and the grading material to separate from and migrate to a location beneath the inert support media; and at least one inert support media outlet associated with at least one of the plurality of stacked screens, wherein the at least one inert support media outlet directs separated inert support media to a location outside the enclosure.

2. The system of claim 1, further comprising:

a separated inert support media conveyor for conveying the separated inert support media to the location outside of the enclosure for disposal as non-hazardous waste.

3. The system of claim 1, further comprising:

an oxidizable catalyst material outlet associated with at least another of the plurality of stacked screens, wherein the oxidizable catalyst material outlet directs separated oxidizable catalyst material out of the enclosure.

4. The system of claim 1, further comprising:

a closed conveyor outlet for conveying the separated oxidizable catalyst material and the grading material to a location outside of the enclosure.

5. The system of claim 4, wherein conveying the separated oxidizable catalyst material to the location outside of the enclosure includes conveying the separated oxidizable catalyst material in a closed conveyor containing the inert gas.

6. The system of claim 1, further comprising:

an inert gas inlet associated with the enclosure for conveying the inert gas to the enclosure.

7. The system of claim 6, wherein the inert gas inlet is located in a lower portion of the enclosure to enable the inert gas to flow over the oxidizable catalyst material and exit the enclosure through a top portion of the enclosure.

8. The system of claim 1, further comprising:

a sensor for detecting a reduction of oxygen in the enclosure.

9. The system of claim 1, further comprising:

a mixture conveyor for conveying the mixture to the at least one mixture inlet, wherein the mixture conveyor is in flow communication with the enclosure and is enclosed to contain the inert gas.

10. The system of claim 9, further comprising:

at least one flow bin associated with an end of the mixture conveyor for supplying the mixture to the mixture conveyor, wherein the mixture conveyor is sealingly engaged with the flow bin and the enclosure to contain the inert gas.

11. The system of claim 10, wherein the mixture conveyor includes a screw auger.

12. The system of claim 10, wherein the mixture conveyor includes a controllable inlet for permitting selective passage of the mixture while limiting loss of the inert gas.

13. The system of claim 1, further comprising:

a regulator for at least periodically supplying additional inert gas to the enclosure to account for loss of the inert gas.

14. The system of claim 1, wherein the enclosure and plurality of stacked screens are configured as a portable unit for movement between industrial sites.

15. The system of claim 1, further comprising:

a grinder for grinding the separated oxidizable catalyst material into a powder.

16. The system of claim 1, further comprising:

an observation window in an outer wall of the enclosure, and an illuminator within the enclosure to enable external observation of the mixture segregation.

17. The system of claim 1, wherein the inert gas comprises, at least in part, nitrogen.

18. The system of claim 1, further comprising:

a pressurized inert gas tank flow-connected to the enclosure.

19. The system of claim 1, further comprising:

an air lock associated with the inert support media outlet for limiting the inert gas from leaving the enclosure via the inert support media outlet.

20. The system of claim 1, further comprising:

an air lock associated with the oxidizable catalyst material outlet for limiting the inert gas from leaving the enclosure via the oxidizable catalyst material outlet.

* * * * *